United States Patent [19]

Pooler et al.

[11] Patent Number: 4,768,091
[45] Date of Patent: Aug. 30, 1988

[54] TESTING APPARATUS FOR DISPLAYING SCANNING BEAM SPOT SIZE AND LINE FOCUS ON A CRT VIDEO SCREEN

[75] Inventors: Robert E. Pooler; William R. Kaylor, both of Knoxville, Tenn.

[73] Assignee: North American Philips Corp., New York, N.Y.

[21] Appl. No.: 110,251

[22] Filed: Oct. 19, 1987

[51] Int. Cl.$^4$ .......................................... H04N 17/04
[52] U.S. Cl. .................................. 358/139; 324/404; 328/187; 328/188
[58] Field of Search ................. 358/139, 10; 324/404; 328/187, 188

[56] References Cited

U.S. PATENT DOCUMENTS 4,536,792  8/1985  Harshbarger ...................... 358/139
4,568,975  2/1986  Harshbarger ...................... 358/139

*Primary Examiner*—Howard W. Britton
*Attorney, Agent, or Firm*—Thomas A. Briody; Leroy Eason

[57] ABSTRACT

Testing apparatus in accordance with the invention generates a composite video signal for a CRT which produces a scanning line raster on the video screen thereof clearly displaying the spot size and line focus of the scanning electron beam generating such raster. The display consists of a single scanning test line of high luminance, or white, within an intermediate low luminance or black portion of an otherwise white scanning line raster. The test line is segmented, with black gaps at several discrete locations thereon, each gap being approximately three times the width of the scanning beam spot. Centered within each such gap is a region of high luminance, or white, of a width approximately that of the beam spot. The line focus and spot size of the smallest possible picture element is thereby accurately displayed and so can be measured on the video screen, enabling adjustment of the focussing components for optimum focus.

9 Claims, 4 Drawing Sheets

TESTING APPARATUS FOR DISPLAYING SCANNING BEAM SPOT SIZE AND LINE FOCUS ON A CRT VIDEO SCREEN

BACKGROUND OF THE INVENTION

1. Field of the Invention

This invention relates to apparatus for testing cathode ray video display tubes (CRTs), and particularly to apparatus for generating a video pulse signal which produces on the video screen of a CRT a scanning test line displaying the spot size and line focus of the electron scanning beam of such CRT. Line focus can thereby be adjusted and measured at any desired light output, using the same video signal.

2. Description of the Related Art

A problem encountered in mass production of CRT display tubes for television receivers and video monitor terminals is determination of whether the beam is correctly focussed on the display screen. Conventional practice is to assume that if the beam current conforms to established specifications the beam will be in correct focus. However, due to variations in CRT design and construction or, in the case of a color CRT, the positioning of the shadow mask, there may be considerable variation in spot size, and consequently in scanning line focus, on the face of the display screen even with a given value of beam current.

In order to adjust line focus, the procedure has heretofore been to apply a video signal to the CRT which produces a specific test pattern, such as an Indian head, on the video screen. The operator then adjusts the focusing components of the CRT and the current supplied thereto until the lines in the test pattern appear as sharp as possible. The accuracy of this procedure obviously depends to a large extent on the skill of the operator, resulting in considerable variation in line focus and spot size from one CRT to another. At maximum beam current, corresponding to maximum brightness of the beam spot on the video screen, the size of the spot increases or "blooms", and if excessive, will result in loss of image detail.

SUMMARY OF THE INVENTION

Testing apparatus in accordance with the invention generates a composite video signal for a CRT which produces a scanning line raster on the video screen thereof clearly displaying the spot size and line focus of the scanning electron beam generating such raster. The display consists of a single scanning test line of high luminance, or white, within an intermediate low luminance or black portion of an otherwise white scanning line raster. The test line is segmented, with black gaps at several discrete locations thereon, each gap being approximately three times the width of the scanning beam spot. Centered within each such gap is a region of high luminance, or white, of a width approximately that of the beam spot. The line focus and spot size of the smallest possible picture element is thereby accurately displayed and so can be measured on the video screen, enabling adjustment of the focussing components for optimum focus.

The selected test line is preferably near the center of one field of each frame of a standard NTSC scanning line raster, with black bands several scanning lines in width extending above and below the test line, the video signal being at black level during such lines. The discrete locations at which the test line is segmented may be adjacent each end thereof and at the center, a single small white spot being displayed at each of those locations. The portions of the scanning line raster above and below the black portions thereof are produced at the white luminance level.

The testing apparatus comprises circuit means for generating a plurality of video pulse signal waveforms, each pulse producing a transition between high and minimum luminance levels on the display screen. Such circuit means may comprise a plurality of pulse generators respectively generating respective video signals for respective portions of the scanning line raster, and a video multiplexing circuit for combining such signals to derive the composite video test signal. Each pulse generator is activated by a timing pulse produced by a logic circuit which, by counting the synchronizing pulses produced by a conventional synchronizing pulse generator for synchronizing the scanning line raster, produces such timing pulses at instants at which the respective pulse generator outputs must be switched to the high luminance level. As will be apparent to those skilled in the art, such a logic circuit may be a microprocessor which is programmed to generate such timing pulses upon reaching the appropriate scanning line count values. The respective pulse generators may also be comprised in such a microprocessor.

DESCRIPTION OF THE PREFERRED EMBODIMENTS

A standard NTSC display raster consists of 525 scanning lines per frame, occurring in two successive fields at the rate of 60 fields per second, each scanning line having a duration of about 63.5 $\mu$s. A horizontal blanking pulse during retrace occurs prior to commencement of each scanning line, having a duration of about 10.9 $\mu$s. The actual scanning time per line is therefore 52.6 $\mu$s. Of the 262.5 lines in each field, the first 21 occur during the vertical blanking interval following the end of the preceding field, leaving only 241 active scan lines. Thus, the center of the first field of each frame is line 121. Applicants have found that a test line slightly below the mathematical center of the visual raster is preferable because of normal overscan, and therefore that line 137 is preferable as the selected test line. As stated, it has a duration of 52.6 μs.

Figure 1:
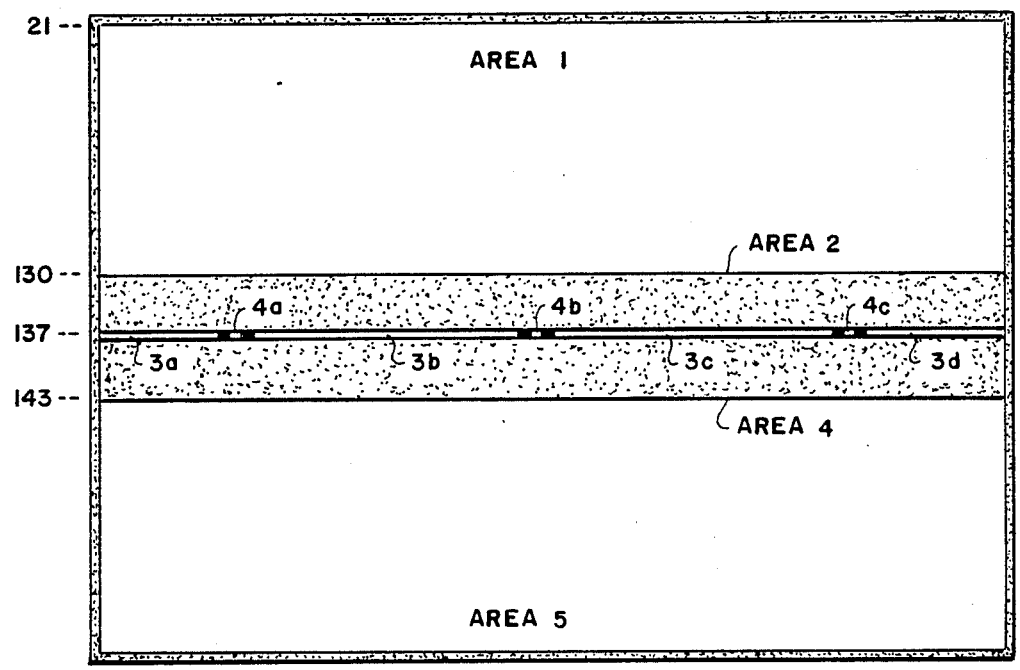
FIG. 1 shows the spot size and line focus evaluation display produced on the video screen of a CRT by testing apparatus in accordance with the invention.

A display produced on a CRT video screen in accordance with the invention, including such a test line, is shown in FIG. 1. The upper white area 1 thereof is made up of horizontal (H) scan lines 22 through 129, since scan lines 1 through 21 occur during the vertical (V) blanking interval. Scan lines 22 through 12 q are at the white high luminance level, such as 100 IRE units. The area 2 above line 137 consists of a band of H scan lines, such as the seven lines 130 through 136, which are at a minimum or black luminance level of 7.5 IRE units, such level being the so-called "set-up" for establishing a standard black value relative to the blanking pulse luminance level of zero IRE units.

The scanning test line 137 occurs only in the first field of each frame, since the record field of each frame is maintained at the black set-up level. As shown, such test line consists of four distinct segments 3a–3d at high luminance, with a gap between successive segments of a width three times that of the scanning beam spot on the display screen. Each gap is at the black luminance level. Centered therein, and at the white luminance level, is a region of a width equal to that of the scanning beam spot. Such gaps, with the respective high brightness regions 4a, 4b, 4c therein, are preferably located at the center and near to each end of test line 137.

The area 4 below test line 137 in the display in FIG. 1 is similar to upper black area 2, and is a band of the same number of H scan lines, such as the seven lines 138 through 144, which are at the black or minimum luminance level. The lower white area 5 of the display is similar to upper white area 1, and is made up of H scan lines 145 through 262 at the white luminance level.

Figure 2:
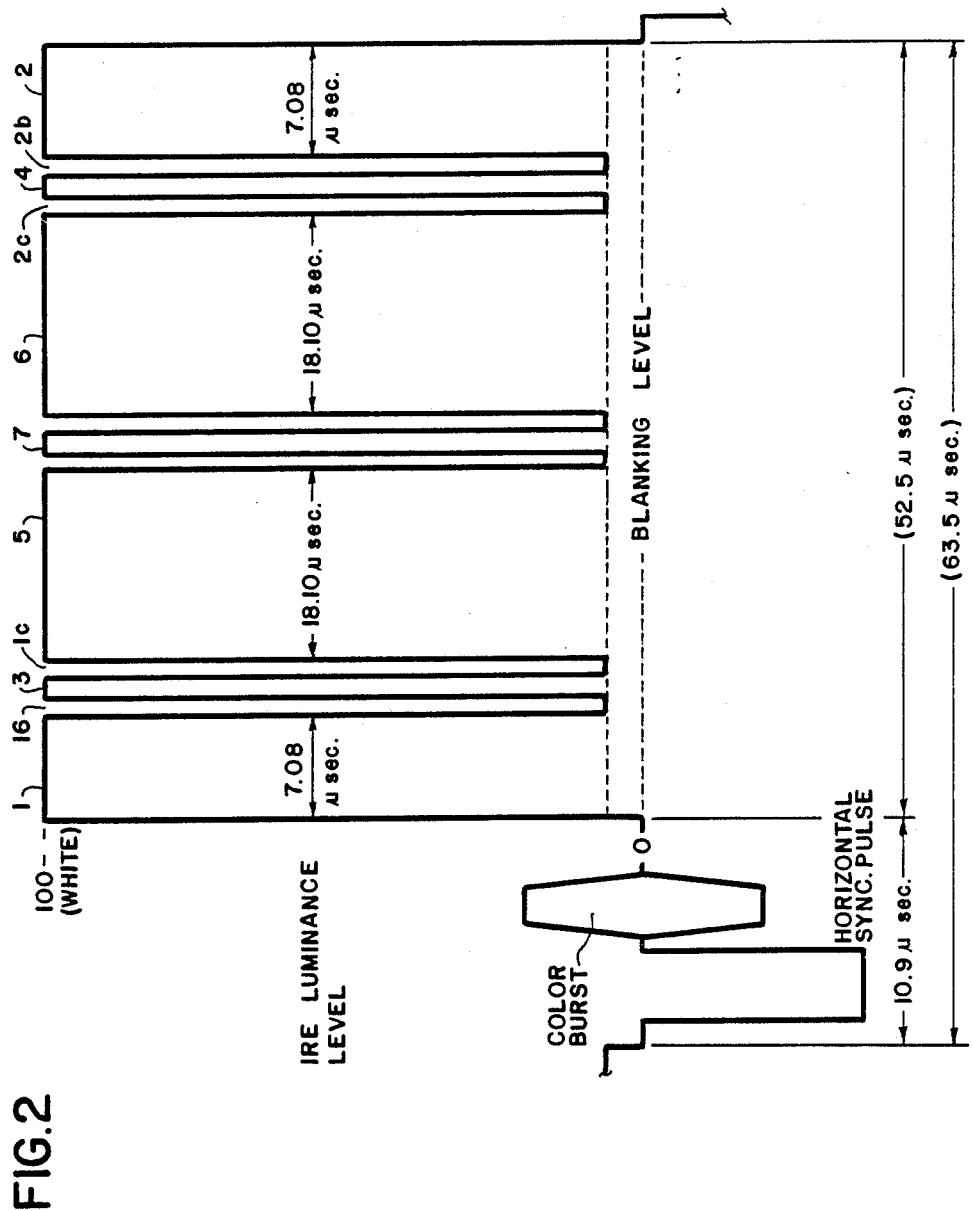
FIG. 2 shows a composite video signal waveform for producing the scanning test line shown in FIG. 1.

Referring now to FIG. 2, there is shown the waveform of a composite video pulse signal which will produce scanning test line 137 as shown in FIG. 1. The H blanking pulse at the beginning of the line, including the H synchronizing pulse and accompanying color burst, has a duration of 10.9 μs, leaving 52.6 μs for the visual scanning line.

In order to produce the white segments 3a and 3d at equal distances from the beginning and the end of the test line in FIG. 1, a high luminance or "white" level video pulse is required during such segments, such as pulses 1 and 2 in FIG. 2. If each of such segments are to be approximately one-ninth of the total length of the test line, which has a total duration of 63.6 μs, pulses 1 and 2 should each be of approximately 7 μs duration. The precise duration which applicant has employed is 7.08 μs. During an interval corresponding to the width of the scanning beam spot, which is typically 0.25 μs, following initial pulse 1 and preceding final pulse 2 the video signal must be returned to the black luminance level. These are the intervals 1b and 2b in FIG. 2. During a similar interval of one spot width following black interval 1b and preceding black interval 2b, the video signal must be restored to the white level, such white luminance level pulse intervals being at 3 and 4 in FIG. 2. After a black interval 1c of one spot width following white pulse 3, the video signal must be a white level pulse 5. Similarly, preceding a black interval 2c of one spot width prior to white pulse 4, the video signal must be another white level pulse 6.

Pulses 5 and 6, corresponding to test line segments 3b and 3c in FIG. 1, are contiguous except for a gap therebetween in which a high luminance region of one spot width is to produced centered therein and which is also at the center of test line 3. To achieve that, pulses 5 and 6 are each of a duration of 18.10 μs and have a gap of three spot widths, or 0.75 μs, therebetween. Centered in such gap, commencing 0.25 μs after pulse 5 and terminating 0.25 μs prior to pulse 6 is a single pulse 7 of 0.25 μs duration.

Thus, pulses 1 and 2 will produce test line segments 3a and 3d in FIG. 1, pulses 5 and 6 will produce test line segments 3b and 3c, and pulses 3, 7 and 4 will produce the regions 4a, 4b and 4c at the white high luminance level and of one spot width centered between such segments. It will be apparent that pulses 1, 5, 6 and 2 for generating the test line segments could be produced by a single pulse generator having that composite waveform. Alternatively, Pulses 1 and 2, each of 7.08 μs duration and separated by an interval of 38.45 μs, constitute a video signal which is readily generated by a conventional pulse generator 2 shown in block form in FIG. 4, such signal having the waveform 2 shown in FIG. 3B. Similarly, pulses 5 and 6 in FIG. 2, each of 18.10 μs duration and separated by an interval of 0.75 μs, pulse 5 commencing 7.83 μs after commencement of the test line, constitute a video signal which is readily generated by a conventional pulse generator 4 shown in block form in FIG. 4, such signal having the waveform 4 shown in FIG. 3B.

Figure 3A:
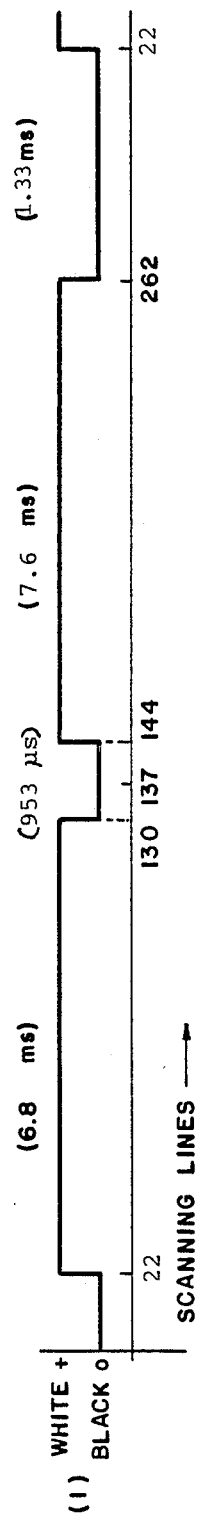
FIG. 3A shows the video signals for all scanning lines of the display in FIG. 1 except test scanning line 137.
Figure 3B:
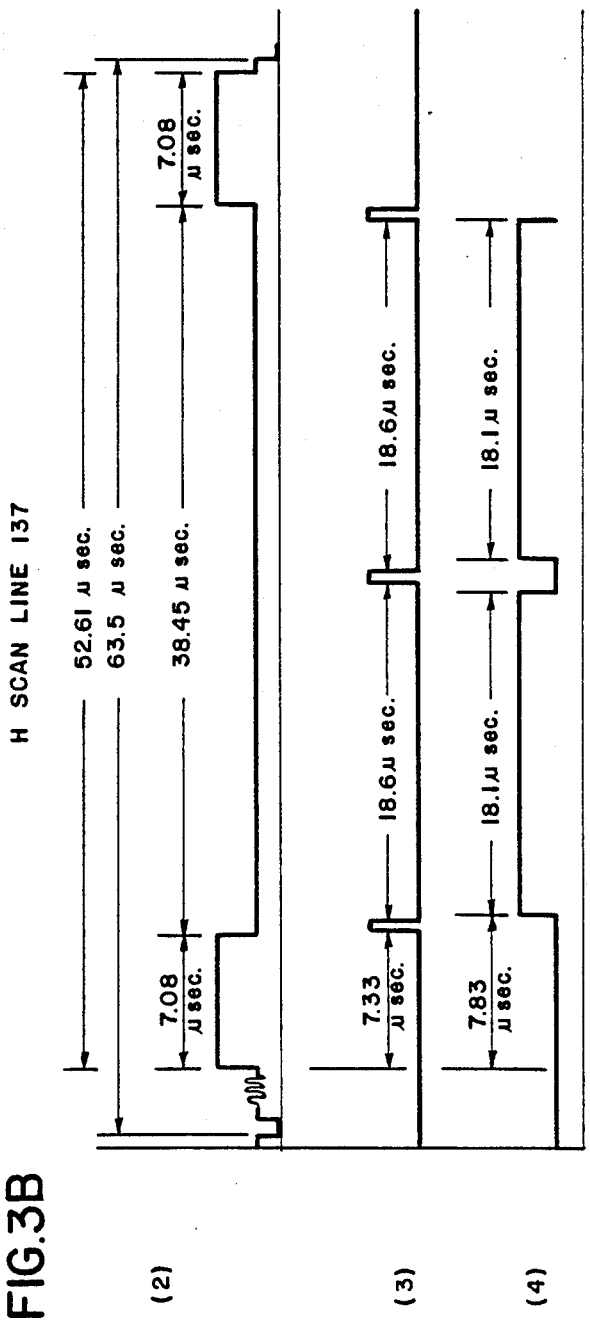
FIG. 3B shows three respective video signal waveforms, which are readily generated by respective pulse signal generators, which in combination and together with the video signals in FIG. 3A, provide a composite video signal which results in a display as shown in FIG. 1.
Figure 4:
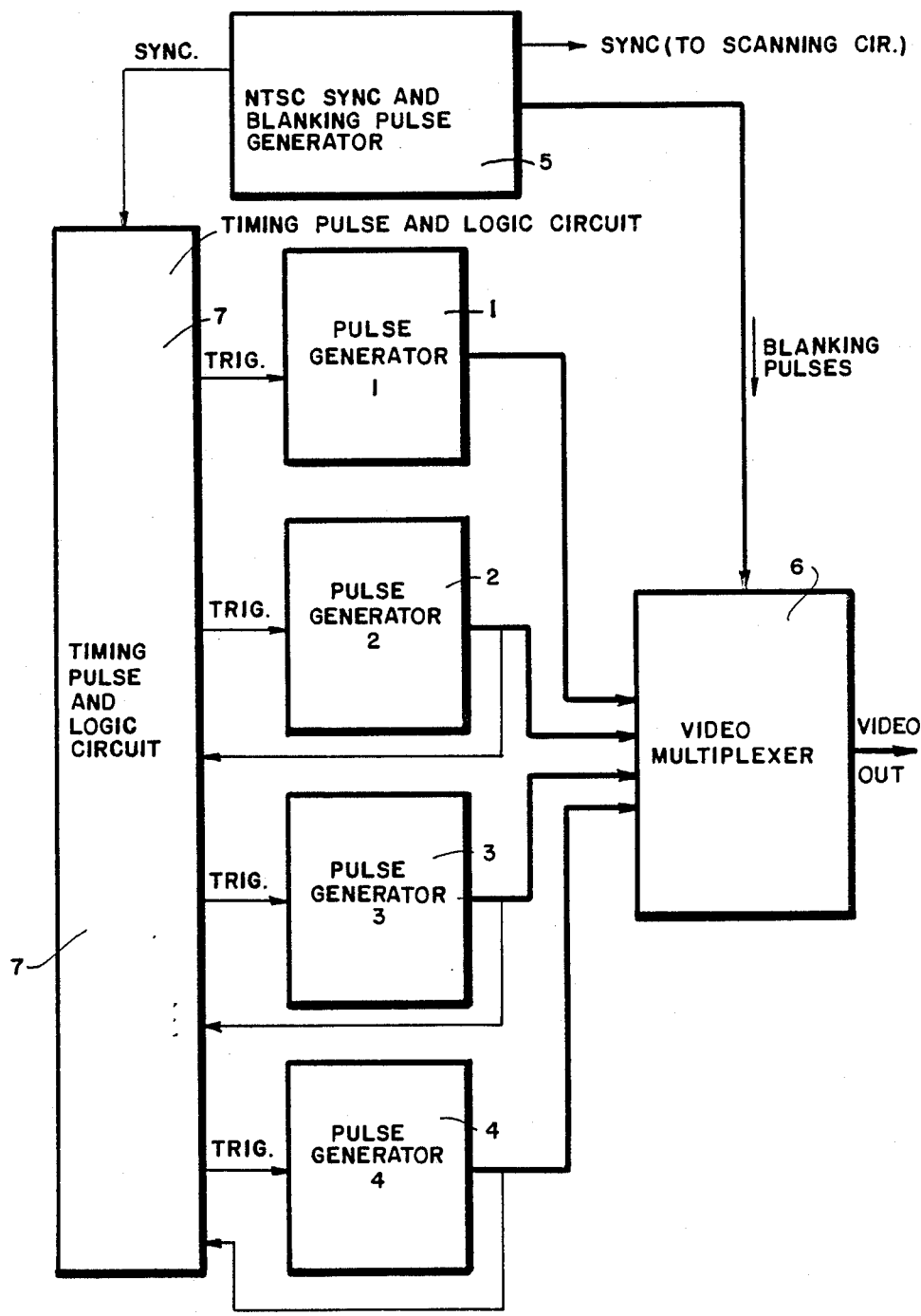
FIG. 4 is a circuit diagram, in block form, of circuit means comprising respective pulse generators controlled by a logic circuit producing timing pulses which respectively initiate generation of the respective pulse signal waveforms in FIG. 3 which when combined at the correct instants during the scanning line raster produce on the video screen of a CRT the desired test line display.

Pulses 3, 7 and 4 in FIG. 2, each of 0.25 μs duration and separated by 18.85 μs, commencing 7.33 μs after pulse 1 and last occurring 0.5 μs prior to pulse 2, constitute a video signal which is readily generated by a conventional pulse generator 3 shown in block form in FIG. 4, such signal having the waveform 3 shown in FIG. 3B. The combined outputs of pulse generators 2, 3 and 4 will thereby generate test line 137 in FIG. 1.

It is, of course, also necessary to provide a video pulse signal for white scanning lines 22–129 in the upper area 1 of the display shown in FIG. 1, blanking of scanning lines 130–136 and 138–144, and for white scanning lines 145–262½ in lower area 5 of the display. For that purpose, the circuit in FIG. 4 further comprises a pulse generator 1 shown in block form therein producing an output pulse video signal having the waveform 1 shown in FIG. 3A. As seen, it remains at the white level during all scanning lines 22–262½ of the first video field except scanning lines 130 through 144, an interval of 953 μs during which it is at the black level.

The circuit in FIG. 4 also includes a conventional NTSC generator 5 producing synchronizing, color burst and blanking pulses, the synchronizing pulses being supplied to scanning circuits (not shown) for the video display CRT. The blanking pulses are included in the composite video signal. The outputs of pulse generators 1–4 and the blanking pulses from blanking pulse generator 5 are combined in a conventional video multiplexing circuit 6, the output of which constitutes a composite video signal for application to the video input terminal of the video display CRT. In order to assure that each of pulse generators 1–4 are actuated or triggered on at the correct instants, the circuit in FIG. 4 also comprises a pulse trigger and logic circuit 7 for generating timing pulses for actuating such pulse generators.

Pulse trigger and logic circuit 7 can typically be a conventional microprocessor, such as employed in the Model 1910 digital generator manufactured by Tektronix Corporation of Beaverton, Oreg., and is connected to blanking pulse generator 5 to count the H sync pulses produced thereby. Upon detecting the sync pulse initiating line 22, the first scan line of the display, logic circuit 7 supplies a first trigger pulse to actuate pulse generator 1. Pulse generator 1 then produces at its output a pulse video signal having the waveform 1 shown in FIG. 3A and which continues until the end of scanning line 262 marking the end of the video field to be displayed. Upon detecting occurrence of the sync pulse for initiating line 263, logic circuit 7 triggers pulse generator 1 back to its quiescent state, and it remains in that condition until logic circuit 7 again detects the occurrence of the sync pulse for initiating scanning line 22 of the first field of the next succeeding frame of the video image It will be seen from FIG. 3A that the video signal 1 produced by pulse generator 1 returns to the black level during scanning lines 130 to 144. During that interval, upon occurrence of the sync pulse initiating test line 137, logic circuit 7 supplies a second trigger pulse to pulse generator 2 which actuates it to then generate the video pulse signal 2 shown in FIG. 3B as described above. Logic circuit 7 is also connected to the output of pulse generator 2, and in response to termination of the initial 7.08 μs pulse at such output logic circuit 7 supplies a third trigger pulse to trigger pulse generator 3 after a delay of 0.25 μs. Pulse generator 3 is thereby actuated to produce at its output the video pulse signal 3 shown in FIG. 3B. Logic circuit 7 is further connected to the output of pulse generator 3, and in response to termination of the initial 0.25 μs pulse produced at such output logic circuit 7 supplies a fourth trigger pulse to pulse generator 4 after a delay of 0.25 μs. Pulse generator 4 is thereby actuated to produce at its output the video pulse signal 4 shown in FIG. 3B.

Upon detecting the sync pulse from blanking pulse generator 5 for scanning line 138 following test scanning line 137, logic circuit 7 supplies a trigger pulse to each of pulse generators 2–4 which returns them to the quiescent state. Subsequently, as seen from the waveform of video pulse signal 1 in FIG. 3A, upon initiation of scanning line 145 pulse generator 1 restores video signal 1 to the white luminance level where it remains until completion of line 262 at the end of the video field.

It will be apparent to those skilled in the art that the functions of pulse generators 1–4 and logic circuit 7 could be provided by a single microprocessor which is programmed to produce a composite of waveforms 1–4 shown in FIGS. 3A and 3B.

What is claimed is:

1. Testing apparatus for a cathode ray tube in which a scanning electron beam produces a scanning line raster on the video screen of such tube, such apparatus generating a composite video signal for such tube which produces a display of the scanning beam spot size and scanning line focus on such screen, such apparatus comprising:

first pulse generating means for producing a first video pulse signal of constant high luminance level in an upper and a lower area of said raster, such first video pulse signal being of minimum luminance level during an intermediate area of said raster between the upper and lower areas thereof;

second pulse generating means for producing a second video pulse signal of said high luminance level during successive segments of a selected scanning test line which is within said intermediate area of said raster, such second video pulse signal being at the black luminance level during portions of such test line between said high luminance segments thereof, the width of each of such black portions of said test line being approximately three times the width of the scanning beam spot on said video screen;

third pulse generating means for producing a third video pulse signal of said high luminance level in regions of said selected scanning line centered within each of said black portions thereof, the width of each of such high luminance regions being approximately equal to that of the scanning beam spot on said video screen; and video multiplexing circuit means connected to each of said first, second and third pulse generating means for combining the first, second and third video pulse signals produced thereby so as to form said composite video test signal.

2. Testing apparatus in accordance with claim 1, wherein said raster is repeated in recurring video frames of interlaced video fields, and the video pulse signals produced by said pulse generating means are only produced during one field of each of such video frames.

3. Testing apparatus in accordance with claim 1, further comprising a synchronizing and blanking pulse generator connected to said video multiplexing circuit means for supplying blanking pulses thereto which are included in the composite video test signal derived thereby; and logic circuit means connected to said synchronizing and blanking pulse generator and responsive to synchronizing pulses produced thereby to generate timing pulses for actuating each of said first, second and third pulse generating means at instants at which the video pulse signals produced thereby become of high luminance level to produce high luminance portions of said raster.

4. Testing apparatus in accordance with claim 3, wherein said logic circuit means is a microprocessor.

5. Testing apparatus in accordance with claim 4, wherein said first, second and third pulse generating means are comprised in said microprocessor.

6. Testing apparatus for a cathode ray tube in which a scanning electron beam produces a scanning line raster on the video screen of such tube, such apparatus generating a composite video signal for such tube which produces a display of the scanning beam spot size and scanning line focus on such screen, such apparatus comprising:

first pulse generating means for producing a first video pulse signal of constant high luminance level in an upper and a lower area of said raster, such first video pulse signal being of minimum luminance level during an intermediate area of said raster between the upper and lower areas thereof;

second pulse generating means for producing a second video pulse signal of said high luminance level during first and second segments of a selected scanning test line which is within said intermediate area of said raster, such segments having a gap therebetween of said minimum luminance level and of a width three times that of the scanning beam spot;

third pulse generating means for producing a third video pulse signal of said high luminance level during and centered in said gap between said first and second segments of said test line, such third video pulse signal having a duration equal to that of said scanning beam spot; and video multiplexing circuit means connected to each of said first, second and third pulse generating means for combining the first, second and third video pulse signals produced thereby so as to form said composite video test signal.

7. Testing apparatus for a cathode ray tube in which a scanning electron beam produces a scanning line raster on the video screen of such tube, such apparatus generating a composite video signal for such tube which produces a display of the scanning beam spot size and scanning line focus on such screen, such apparatus comprising:

first pulse generating means for producing a first video pulse signal of constant high luminance level in an upper and a lower area of said raster, such first video pulse signal being of minimum luminance level during an intermediate area of said raster between the upper and lower areas thereof;

second pulse generating means for producing a second video pulse signal of said high luminance level during first and second segments of a selected scanning test line adjacent the beginning and end of such line, such test line being in said intermediate area of said raster;

third pulse generating means for producing a third video pulse signal of said high luminances level in a plurality of equally spaced discrete regions along said test line between said first and second segments thereof, each of such discrete regions being of a width equal to that of said scanning beam spot;

fourth pulse generating means for producing a fourth video pulse signal of said high luminance level during further segments of said selected scanning line betwen said discrete regions thereon, each of such further segments being spaced from the discrete regions adjacent thereto by a distance equal to the width of said scanning beam spot;

a synchronizing and blanking pulse generator producing a synchronizing pulse and a blanking pulse prior to each scanning line of said raster;

logic circuit means connected to said synchronizing and blanking pulse generator and to each of said first, second, third and fourth pulse generators and responsive to said synchronizing pulses to provide timing pulses for actuating each of said pulse generators at instants at which the video pulse signal produced thereby become of high luminance level to produce high luminance portions of said raster; and video multiplexing circuit means connected to each of said first, second, third and fourth pulse generating means and to said synchronizing and blanking pulse generator for combining said first, second, third and fourth video pulse signals and said blanking pulses so as to form said composite video test signal.

8. Testing apparatus in accordance with claim 7, wherein said third pulse generating means produces said third video pulse signal of high luminance level during three equally spaced regions along said test line between said first and second segments thereof, each of such three regions being of a width equal to that of said scanning beam spot; and said fourth pulse generating means produces said fourth video pulse signal of high luminance level during third and fourth segments of said test line, such third segment being located between the first and second of said three high luminance regions of said test line and such fourth signal being located between the second and third of such three high luminance regions of said test line, such third and fourth segments having a gap therebetween of a width equal to three times the width of said scanning beam spot.

9. A method of testing a cathode ray tube in which a scanning electron beam produces a scanning line raster on the video screen of such tube, such method producing a composite video test signal which causes such tube to display the scanning beam spot size and scanning line focus on such screen, such method comprising:

producing a first video pulse signal which is of constant white luminance level in an upper and a lower area of said raster and which is of black luminance level over an area of said raster intermediate between the upper and lower areas thereof;

producing a second video pulse signal of said white luminance level in successive segments of a selected test scanning line which is within said intermediate area of said raster, such second signal being of black luminance level during portions of such test line between said white segments thereof, the width of each of such black portions being approximately equal to three times the width of the scanning beam spot on said video screen;

producing a third video pulse signal of said white luminance level in regions of said test line centered within each of said black portions thereof, the width of each of such white regions being approximately equal to that of the scanning beam spot on said video screen; and combining said first, second and third video pulse signals to derive said composite video test signal.

* * * * *